2,933,523
DIETHERS OF 4,4 BIS (4-HYDROXY PHENYL) PENTANOIC ACID

Sylvan O. Greenlee, Racine, Wis., assignor to S. C. Johnson & Son, Inc., Racine, Wis.

No Drawing. Application October 3, 1955
Serial No. 538,243
2 Claims. (Cl. 260—520)

This invention relates to new compositions which are diether monocarboxylic acids prepared from hydroxyaryl-substituted aliphatic acids, and more particularly this invention relates to new diether monocarboxylic acids having lower aliphatic and aryl substituted aliphatic radicals attached through an ether oxygen to a bis(arylene)-substituted aliphatic acid.

It is an object of this invention to provide new compositions from hydroxyaryl-substituted aliphatic acids which are valuable as intermediates in the production of other more complex compositions.

Another object of this invention is to provide new compositions as described hereinbefore which are particularly valuable in the manufacture of complex products such as coating, molding, or adhesive materials having good chemical resistance, hardness and gloss.

These and other objects and advantages are attained by the present invention, various novel features of which will become more fully apparent from the following description with particular reference to specific examples which are to be considered as illustrative only.

Currently, resinous materials are widely used in the formulation of protective coatings, molding compositions, adhesive compositions, etc. Coating compositions, for instance, are frequently prepared by compounding with a varnish type solvent and a plasticizer such as unsaturated animal and vegetable oils, a hard resinous material, in order to give sufficient hardness, gloss, and chemical resistance to the protective coating after it has been cured.

Etheric resins prepared from the diether compositions of this invention have been found to be particularly advantageous as the resin constituent in these coating and molding compositions in that they possess enhanced solubility in the unsaturated drying oils normally employed, as compared to resins prepared from the hydroxyaryl-substituted acids from which they are derived, while giving to the cured product good gloss, hardness, and chemical resistance. The increased chemical resistance of these resins is probably accounted for in part by the fact that the ether groups in these resins are inert to normal hydrolysis by water and alkali to which varnish films are frequently exposed.

In general, the diether acids of this invention may be produced by etherifying hydroxyaryl-substituted aliphatic acids. A wide range in the physical properties of etheric resins prepared from the diether acids of this invention may be realized by variation of the type of constituent reacted with the phenolic hydroxyl groups of the hydroxyaryl-substituted acids in the preparation of the diether acids. For instance, if it is desired to form diether acids useful for the production of resinous products which are prepared so as to have primarily good solubility characteristics as well as hardness and chemical resistance, the diether acids may be prepared with alkyl or aryl-substituted alkyl radicals attached through the ether oxygen to the aromatic nucleus of the hydroxyaryl-substituted acid. By preparing ethers having lower alkylene radicals attached to the ether oxygen, drying characteristics may in addition be imparted to resins prepared from these compositions. Similarly, hydroxylated or halogenated radicals may be used to prepare diether acids having slightly modified properties. By substituting alcoholic hydroxyl groups for the phenolic hydroxyl groups of the hydroxyaryl-substituted acid, for example, a diether having readily esterifiable hydroxyl groups may be prepared. Resinous products having softening points from room temperature up to 130–150° C. may be prepared from the diether acids of this invention, the softening points depending upon the type of diether employed and the method of preparing the polymerized product from the diether acid. In this manner a formulator is provided with a wide range of choice in formulating protective coating, molding, or adhesive products.

The hydroxyaryl-substituted acids employed in this invention have two hydroxy-aryl groups attached to a single carbon atom. The preparation of these substituted acids may be conveniently carried out by condensing a keto-acid with the desired phenol. Experience in the preparation of bisphenols and related compounds indicates that the carbonyl group of the keto-acid should be located next to a terminal carbon atom in order to obtain satisfactory yields. A terminal carbon atom as used herein refers to a primary carbon atom. Prior applications, Serial Nos. 464,607 and 489,300, filed October 25, 1954, and February 18, 1955, respectively, disclose a number of illustrative compounds suitable for use as the hydroxyaryl-substituted acid, and methods of preparing the same. These materials, which are referred to for convenience as Diphenolic Acid, or DPA, comprise the condensation products of levulinic acid and phenol, substituted phenols, or mixtures thereof. Application Serial No. 489,300 is now abandoned.

It is to be understood that the phenolic nuclei of the Diphenolic Acid may be substituted with any groups which will not interfere with the etherification reactions. For example, the nuclei may be alkylated as disclosed in Serial No. 489,300 or they may be halogenated. The Diphenolic Acid derived from levulinic acid and phenol may be advantageous, for instance, since it may be readily prepared to a high degree of purity, the use of substituted phenols, such as the alkylated phenols, usually resulting in mixed compositions which are less readily purified. On the other hand, there are cases where the Diphenolic Acid derived from alkylated phenols are more desirable than those derived from nonalkylated phenols, on the basis that the alkyl groups tend to give better organic solvent solubility, flexibility, and better water resistance.

The diether monocarboxylic acids described herein may be prepared by the reaction of these Diphenolic Acid with halides or sulfates of the corresponding aliphatic or aryl-substituted aliphatic compositions, carrying out the etherification by reacting the alkaline solutions of the Diphenolic Acid with the appropriate halide or sulfate. The preparation and the composition of a typical diether acid may be illustrated by the following equation representing reaction of 2 mols of vinyl-2-chloroethyl ether with 1 mol of 4,4-bis(4-hydroxy-3-methylphenyl)-pentanoic acid.

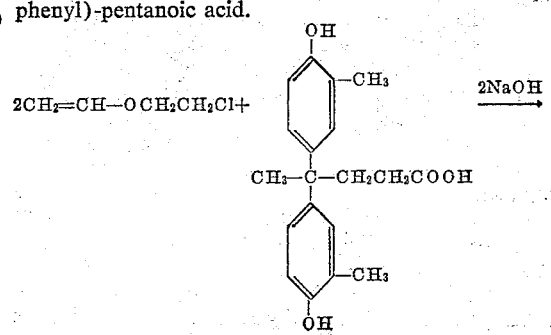

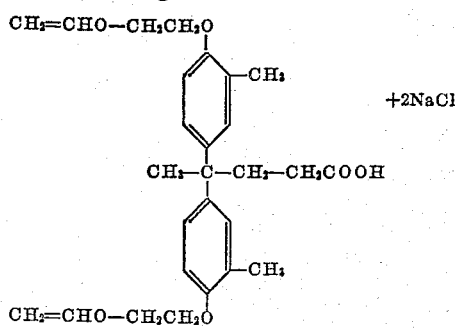

$+2NaCl$

Illustrative of the lower aliphatic compositions which may be reacted with the Diphenolic Acid are such aliphatic materials having about 10 carbon atoms or less as the methyl, ethyl and butyl chlorides, ethylhexyl chloride, the monochlorides of methyl, ethyl and propyl ethers, and sulfates such as dimethyl and diethyl sulfates. Olefin polymerizing characteristics may be imparted to the diethers by using such aliphatic materials as allyl chloride, vinyl-2-chloroethyl ether, 1,3-dichlorobutene-2, methallyl chloride, and 1-chlorobutene-2, these materials containing unsaturated portions in addition to a reactive halogen. Such dichlorides as 1,3-dichlorobutene-2, may be used as a monochloride since the 1-chloro group is much more chemically active than the 3-chloro group attached to a double bond carbon atom, and may be reacted without disturbing the 3-chloro group. Mononuclear aryl substituted lower aliphatic materials such as benzyl chloride or phenyl ethyl chloride can correspondingly be used to impart additional hardness and gloss to resins prepared from the diether acids of this invention. And such materials as ethylene chlorohydrin, glycerol monochlorohydrin, 1-chloro-2-propanol and 1-chloro-3-propanol may be used to prepare hydroxy ether acids which may be further reacted through their hydroxyl groups to form valuable complex products. Each of these materials, as seen from the above, contain a lower aliphatic or aryl-substituted aliphatic radical attached to a single reactive group with respect to the reaction with the phenolic hydroxyl groups to form ether linkages, so that the materials are monofunctional with respect to these phenolic hydroxyl groups. These monofunctional materials, upon reaction with the Diphenolic Acid, form therefore the diether monocarboxylic acids of this invention. As used herein, the term "lower aliphatic" refers to radicals or constituents wherein the aliphatic portion has about 10 or less carbon atoms.

The compositions of this invention may be prepared by etherification of the phenolic hydroxyl groups of the Diphenolic acid using the normal Williamson ether synthesis involving reaction of the metal phenoxide groups, such as the sodium phenoxide, with the appropriate halide or sulfate to split out sodium halide or sodium sulfate, respectively. In the preparation of, for example, the sodium phenoxides, it is necessary to use enough alkali to neutralize both the carboxylic acid groups of the Diphenolic Acid and the phenolic hydroxyl groups of the Diphenolic Acid. It has been found that sodium phenoxide groups are sufficiently more active with the alkyl halides and alkyl sulfates than is the sodium salt of the carboxylic acid groups so that phenolic ether formation may be carried out without appreciable interference from ester formation. In those instances where an hydroxy ether is formed using such materials as ethylene chlorohydrin, there is no appreciable esterification of the ether hydroxyl groups by the Diphenolic Acid since the salt form of the acid is present in the mixture. The reactions are carried out in aqueous solutions so as to completely dissolve the Diphenolic Acid since the alkali derivatives of the Diphenolic Acid would not be appreciably soluble in water-insoluble organic solvents. The reaction temperatures used in carrying out the etherification range from the reflux temperature of the aqueous reaction mixtures (95–100° C.) to 150° C. or even higher temperatures in certain reactions involving relatively inactive halide groups. Reactions carried out, for example, at 150° C. using aqueous alkali solutions require the use of a pressure reaction vessel.

In these preparations, reaction times will also vary widely depending on the activity of the particular halide or sulfate. An active halide, such as allyl chloride, would normally give substantially complete etherification after a period of 1 hour refluxing at 100° C., whereas etherification with normal-butyl chloride might require 8–10 hours' heating at 100° C. Etherification with butyl chloride, on the other hand, at 150° C. would probably require only an hour or so for complete reaction. Use of chlorides in which the chloride reacted is attached to a vinyl carbon atom would require even more strenuous reaction conditions than that required for butyl chloride. The reaction temperature and time required for etherification with such materials as dialkyl sulfates varies somewhat depending on whether or not both alkyl groups of the dialkyl sulfate or one of the alkyl groups of the dialkyl sulfate are to be used in forming the ether. Diethyl sulfate may for example, be used at temperatures considerably below 100° C. if only one of the alkyl groups is to be used. However use of both of the alkyl groups would require temperatures of around 100° C. or more.

In certain cases, it may be desirable to carry out the etherification reaction using an organic solvent, and this may be particularly advantageous in those instances where the use of an aqueous solution would result in appreciable hydrolysis of the halide or sulfate used in the etherification.

The diether acids of this invention are valuable in the preparation of more complex products, the carboxyl groups of the diether acids furnishing a means to further react the diether acids with other materials. Useful products may be obtained, for instance, by reacting these diether acids with such reactants as amides, epoxides, and alcohols. When these reactants are polyfunctional, an opportunity exists to create polymerized and cross-linked reaction products.

As an example, but not as a limitation, it has been found that these dietheric acids form valuable, chemically resistant resins when they are esterified with polyhydric alcohols. Such polyhydric alcohols include both the nonresinous and resinous polyhydric alcohols. Illustrative of nonresinous alcohols which may be used are ethylene glycol, polyethylene glycols, 1,4-butanediol, 2,5-pentanediol, neopentyl glycol, pentaerythritol, sorbitol, polyallyl glycols, triethanolamine, and tetramethylol cyclohexanol.

Resinous alcohols which have been found to give valuable reaction products include such materials as the reaction products of di- and trihydric phenols with chlorohydrins. For example, the reaction of bis(4-hydroxyphenyl)isopropylidene with ethylene chlorohydrin or glycerol monochlorohydrin give a resinous polyhydric alcohol. The reaction of the same dihydric phenol with epichlorohydrin or glycerol dichlorohydrin give resinous polyhydric alcohols which in some cases, in addition to the alcoholic hydroxyl groups, contain epoxide groups. (The epoxide-containing products are well illustrated by the commercially available Epon resins marketed by Shell Chemical Corporation.) The preparation of these resinous polyhydric alcohols is described in U.S. Patents 2,456,408, 2,503,726, 2,615,008, 2,668,805, and 2,668,807.

Esterification of either the nonresinous or resinous polyhydric alcohols with the diether acids is conveniently carried out by direct heating at temperatures of 190–275° C. under conditions where the water produced during esterification is continuously removed as it is formed. In the case where epoxide groups of, for example, a resinous composition of the Epon resin type is partially esterified to the extent of one carboxyl group reacting with one epoxide group, lower temperatures may be used and no water is formed since the reaction of the carboxyl group with the epoxide group is that of direct addition. Since the dietheric acids and the polyhydric alcohols have boiling points which are in most cases above 190° C., the water may be removed by permitting it to volatilize during esterification. Removal of the water may also be facilitated by continuously bubbling through the reaction mixture during esterification a stream of inert gas, such as carbon dioxide or nitrogen. It is also sometimes convenient to facilitate the water removal by carrying out the reaction in a vessel provided with a condenser attached thereto through a water trap, adding a sufficient amount of a volatile, water-insoluble solvent to give reflux at the esterification temperature, and continually removing the water by azeotropic distillation permitting the solvent to return to the reaction mixture after having dropped the water in the water trap.

The following examples will serve to further illustrate this invention, however, it should be understood that the invention is not to be limited thereby. In the examples, proportions are expressed as parts by weight unless otherwise indicated.

Examples I to VII inclusive illustrate the preparation of the dietheric acids of this invention.

Example I

To an aqueous alkali solution of 100 parts of NaOH dissolved in 50 parts of water was added 143 parts of 4,4-bis(4-hydroxyphenyl)-pentanoic acid. With continuous agitation 126 parts of dimethyl sulfate was added over a period of 40 minutes holding the temperature at 10–20° C. The reaction mixture was then gradually heated to reflux temperature over a period of 30 minutes and held at this temperature for 2½ hours. At this point an additional 20 parts of NaOH dissolved in 100 parts of water was added, heating at 100° C. being continued for an additional 2 hours. After the reaction mixture had cooled sufficient HCl was added to completely neutralize any excess NaOH. The precipitated diether acid was repeatedly washed by vigorous agitation in hot water until free from inorganic salts. The product was then dried by heating to 130° C. giving a soft, heavy sirup having an acid value of 176. The yield was 86% of the theoretical amount. Acid values as used herein are defined as the number of milligrams of KOH required to neutralize the acidity of a 1-gram sample.

In a similar manner the diethyl ether was prepared from diethyl sulfate to give a product having an acid value of 164.

Example II

To an alkaline solution containing 10 parts of NaOH dissolved in 800 parts of water was added 286 parts of 4,4-bis(4-hydroxyphenyl)-pentanoic acid. With continuous agitation 161 parts of ethylene chlorohydrin was added, and the temperature was gradually raised to 95° C. over a period of 30 minutes and held at this temperature (refluxing temperature) for a period of 1 hour and 40 minutes. The reaction mixture was then cooled and acidified with HCl to neutralize any unreacted NaOH, and the product was washed with water to remove the sodium chloride. The product was dehydrated by heating to a temperature of 110° C., giving a yield of 88% of the theoretical amount. The acid number of this product was 65 indicating partial esterification during the dehydrating process, whereas the saponification value was 154 as compared to the theoretical saponification value of 150.

Example III

Example II was repeated replacing ethylene chlorohydrin with 2 mols of benzyl chloride, to give after refluxing and purification of the product a product in 98% of the theoretical yield having an acid value of 105.

Example IV

Example II was repeated replacing ethylene chlorohydrin with 2 mols of 1,3-dichlorobutene-2, to give a heavy syrupy product in 80% of the theoretical yield having an acid value of 120.

Example V

Example II was repeated replacing ethylene chlorohydrin with 2 mols of methylallyl chloride to give a heavy syrupy product in 86% yield having an acid value of 142.

Example VI

An etheric acid was prepared using the procedure of Example II save that the ethylene chlorohydrin was replaced with 2 mols of vinyl-2-chloroethyl ether and refluxing was carried on for 44 hours. The product was a hard, brittle solid having an acid value of 117.

Example VII

Example II was repeated replacing ethylene chlorohydrin with 2 mols of n-butyl chloride carrying out the reaction, however, in a pressure vessel at a temperature of 150° C. for a period of 1 hour and 45 minutes. A heavy sirupy product having an acid value of 140 was obtained in 77% yield.

Examples VIII through X, inclusive, illustrate the preparation of etheric resins such as may be prepared from the diether acids of this invention using polyhydric alcohols to form complex polyesters through the carboxyl groups of these diether acids.

Example VIII

A mixture of the dibutyl ether acid of Example VII and tripentaerythritol was prepared using proportions such that the hydroxyl group content of the mixture was 10% in excess of the carboxyl group content. With continuous agitation, this mixture was heated to 220–250° C., until the acid value of the mixture had decreased to 8.8. Xylene reflux was used to remove water formed during the esterification by azeotropic distillation, collecting the water in a side trap and attaching the reflux condenser to the reaction vessel through the trap. The polyester product had a softening point of 62° C. (Softening points as used herein were determined by the Durrans' Mercury Method.)

Example IX

A procedure similar to that of Example VIII was used to prepare a polyester from tripentaerythritol and the dibenzyl ether acid of Example III, the product having an acid value of 8.0 and a softening point of 58° C.

Example X

A procedure similar to that of Example VIII was used to prepare a polyester from tripentaerythritol and the dimethallyl ether acid of Example V, to the product having an acid value of 11.3 and a softening point of 114.5° C.

Example XI

A procedure similar to that of Example VIII was used to prepare a polyester from tripentaerythritol and the diether acid prepared from vinyl-2-chloroethyl ether in Example VI, the product having an acid value of 4.4 and a softening point of 133° C.

The etheric resins prepared from the diether acids of this invention may be used in a wide variety of applications where hard resins such as these are valuable, such as in coating, molding, and adhesive compositions. Examples XII through XIV illustrate the use of etheric resins in typical varnish solutions.

Example XII

A mixture of 1 part of the etheric resin of Example VIII and 2 parts of linseed oil was heated with continuous agitation for a period of 1 hour at 240–260° C. Inert gas was bubbled through the mixture during the heating period. A varnish solution was prepared by dissolving the product in xylene to 50% nonvolatile content and adding .03% cobalt drier based on nonvolatile content. Wet films of .002" thickness were prepared from this varnish solution and heated for 1 hour at 150° C. The films after curing showed no effect on exposure to boiling water for a period of 3 hours.

*Example XIII*

A mixture of 1 part of the etheric resin of Example IX and 2 parts of dehydrated castor oil was similarly heated 1 hour and 50 minutes at 240–260° C. A varnish solution was prepared by dissolving the product in xylene to a nonvolatile content of 50% and adding .03% cobalt drier based on novolatile content. Wet films of .002" thickness prepared from this varnish solution gave flexible, tack-free films on heating for 30 minutes at 150° C. The cured films withstood boiling water for a period of 3 hours.

*Example XIV*

A mixture of 1 part of the etheric resin of Example X and 2 parts of dehydrated castor oil was similarly heated for a period of 40 minutes at 240–260° C. and finally dissolved in xylene to 50% nonvolatile. Thin films of this product containing .03% cobalt drier on nonvolatile content, heated for 30 minutes at 150° C. gave flexible, tack-free surfaces which were unaffected by exposure to boiling water for 3 hours.

It should be understood that while there are disclosed herein but a limited number of embodiments of this invention, it is possible to produce still other embodiments without departing from the inventive concept herein disclosed, and it is intended, therefore, to cover all modifications of the invention which would be apparent to one skilled in the art and that come within the scope of the appended claims.

It is claimed and desired to secure by Letters Patent:

1. A compound having the general formula

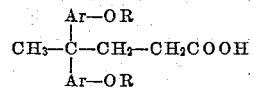

wherein Ar is a phenyl radical coupled through the aromatic nucleus thereof and R is an alkyl radical having from 1–10 carbon atoms; the radicals —OR being in a position para to the point of attachment of the Ar entity to the aliphatic chain.

2. A compound having the general formula

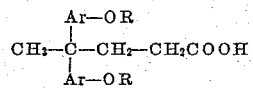

wherein Ar is a phenyl radical coupled through the aromatic nucleus thereof and R is a phenyl-substituted alkyl radical having from 1–10 carbon atoms in the alkyl chain; the radicals —OR being in a position para to the point of attachment of the Ar entity to the aliphatic chain.

References Cited in the file of this patent

UNITED STATES PATENTS

| | | |
|---|---|---|
| 2,499,920 | Hunter et al. | Mar. 7, 1950 |
| 2,691,044 | Kolling et al. | Oct. 5, 1954 |

FOREIGN PATENTS

| | | |
|---|---|---|
| 978,016 | France | Apr. 9, 1951 |

OTHER REFERENCES

Behrens et al.: Chem. Absts., vol. 43, pp. 2271–73 (1949).

Quelet et al.: Chem. Absts., vol. 44, p. 5331 (1950).

Bader et al.: J.A.C.S., 76, pp. 4465–6, Sept. 5, 1954.

UNITED STATES PATENT OFFICE

CERTIFICATE OF CORRECTION

Patent No. 2,933,523                                                            April 19, 1960

Sylvan O. Greenlee

It is hereby certified that error appears in the printed specification of the above numbered patent requiring correction and that the said Letters Patent should read as corrected below.

Column 3, lines 51 and 52, for "Diphenolic acid" read -- Diphenolic Acid --; column 5, line 29, for "50 parts" read -- 500 parts --; line 53, for "10 parts" read -- 130 parts --.

Signed and sealed this 18th day of October 1960.

(SEAL)
Attest:
KARL H. AXLINE
Attesting Officer

ROBERT C. WATSON
Commissioner of Patents